Figure 1:
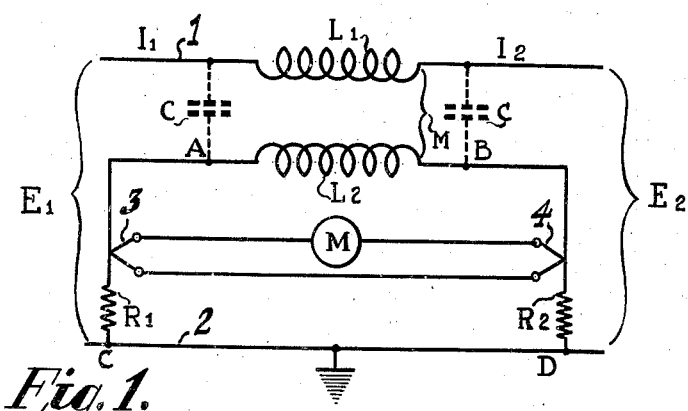

March 21, 1944.   C. A. ROSENCRANS   2,344,641

RADIO FREQUENCY WATTMETER

Filed Nov. 2, 1942

Inventor
CHARLES A. ROSENCRANS
By
Attorney

Patented Mar. 21, 1944

2,344,641

UNITED STATES PATENT OFFICE 2,344,641

RADIO FREQUENCY WATTMETER

Charles A. Rosencrans, Haddonfield, N. J., assignor to Radio Corporation of America, a corporation of Delaware Application November 2, 1942, Serial No. 464,299

14 Claims. (Cl. 171—95)

This invention relates generally to electrical measuring instruments and particularly to wattmeters for measuring the radio frequency power applied to high frequency transmission lines.

Various methods and apparatus utilized heretofore for the measurement of power in radio frequency transmission lines have involved the use of relatively complicated circuits which, in many instances, have necessitated the absorption of considerable power from the transmission line. The instant invention contemplates the use of a simple coupling unit which provides inductive and capacitive coupling to one or more conductors of the transmission line. The coupling unit is connected at its extremities through two thermo-couple heater elements to a suitable return circuit such as ground. The device operates upon the principle of indicating the difference between the squares of the sum and the difference of the currents derived from the inductive and capacitive coupling, respectively, to the line.

For most satisfactory operation, the coupling unit should be loosely coupled to the line to provide a relatively low series inductance in the line, and a relatively low shunt capacity to the line. The sensitivity of the indicating instrument may be adjusted by varying the shunt capacity to the line. However, any increase in capacity will increase the meter load upon the line. In all cases, the shunt resistance on the line provided by the thermo-couple heater elements should be considerably less than the shunt reactance of the capacity coupling and should exceed the series reactance of the series inductance in the line.

Under these conditions line input power to the coupling unit will be proportional to the line voltage E1 and line current I1. Since the wattmeter is loosely coupled to the line and reflects a relatively low series reactance into the line, the output voltage and current E2 and I2 will likewise be substantially proportional to the input voltage and current E1, I1. The inductive coupling, represented by the mutual inductance $m$, which should preferably be unitary, will provide an inductive current Il in the loop circuit comprising the inductive coupling unit, the first thermo-couple heater unit R1, the return circuit and the second thermo-couple heater unit R2. Therefore, the inductive current Il will be in different directions in the two thermo-couple heater units R1, R2.

The capacitive current Ic in the loop circuit, however, will flow in the same direction through both thermo-couple heater units to the grounded return circuit. Therefore, the inductive and capacitive currents will have an additive effect upon the first thermo-couple heater unit R1, and a differential effect upon the second thermo-couple heater unit R2. A meter connected in series with both thermo-couples will therefore indicate the difference of the squares of the sum and difference of the inductive and capacitive currents to the thermo-couple heater elements. Since the inductive current is proportional to the transmission line current at a phase angle of 90°, and the capacitive current is proportional to the transmission line voltage at a phase angle of minus 90°, the meter indication will be proportional to the power in the transmission line.

Among the objects of the invention are to provide a new and improved method of and means for measuring power in a radio frequency transmission line. Another object of the invention is to provide a new and improved method of and means for measuring the power in a radio frequency transmission line wherein the measuring instrument absorbs a minimum amount of power from the line and reflects minimum reactance therein. A further object of the invention is to provide an improved method of and means for measuring power in a radio frequency transmission line which comprises a cylindrical conducting element coaxial with, and surrounding, a portion of one or more of the conductors of the transmission line, thermo-couple means connected adjacent the extremities of the coupling unit, and a return circuit to form an external loop circuit.

A further object of the invention is to provide an improved method of and means for measuring the power in a balanced radio frequency transmission line wherein coaxial, cylindrical coupling devices are provided for each conductor of the line, and thermo-couple elements connected between adjacent extremities of the conductive coupling units. Another object is to provide a power measuring device for a coaxial transmission line wherein a cylindrical conducting coupling unit surrounds the inner conductor of the transmission line, thermo-couple units are connected from the extremities of the coupling unit to adjacent portions of the outer conductor of the transmission line, and means for connecting the thermo-coupled units to a shielded external meter circuit.

Figure 2:
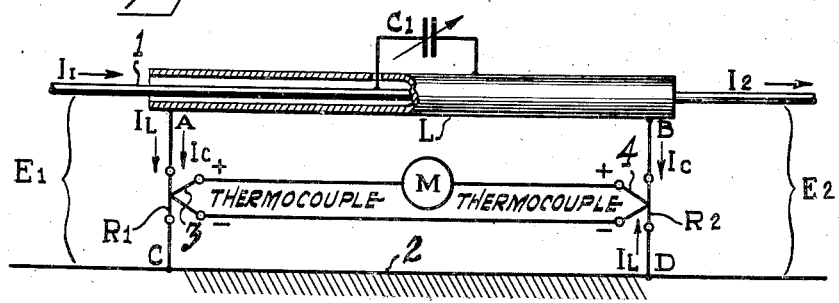
Figure 3:
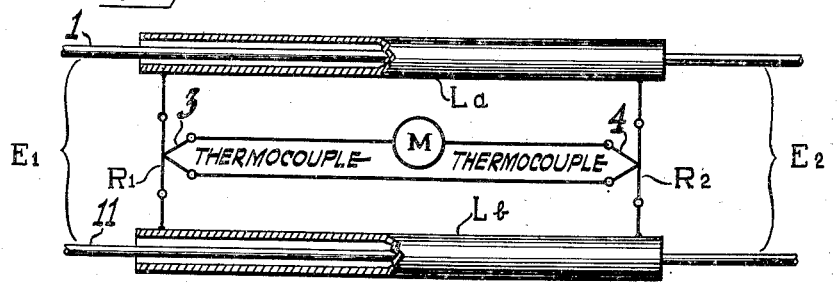
Figure 4:
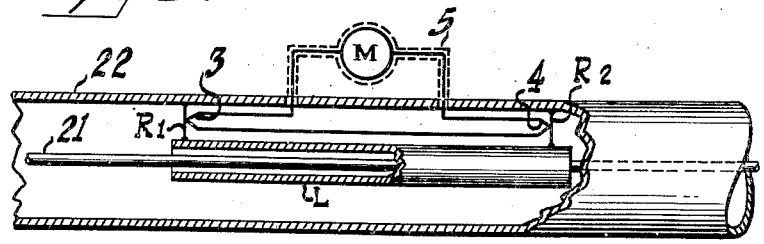

The invention will be described by reference to the accompanying drawing of which Figure 1 is a schematic circuit diagram of one embodiment thereof; Figure 2 is a partially schematic circuit diagram of the same embodiment as Figure 1 but showing constructional details of the coupling unit; Figure 3 is a partially schematic circuit diagram of a second embodiment showing the constructional details of the coupling unit for a balanced transmission line; and Figure 4 is a cross-sectional diagram of an embodiment of the invention adapted to use with a coaxial transmission line. Similar reference numerals are applied to similar elements throughout the drawing.

Referring to Figure 1, a transmission line including the conductor 1 and the grounded return circuit 2 is supplied with radio frequency power from a source, not shown, and coupled to a load circuit, not shown. The line voltage is represented by E1 and the line current by I1. The coupling unit, which will be described in greater detail hereinafter, comprises an inductive element L1 in series with the transmission line 1 inductively coupled to a second inductive element L2. The inductive elements L1 and L2 should have a substantially unitary mutual inductance. The coupling unit also includes capacity coupling between the transmission line 1 and the coupling coil L2 which is represented by the capacitors C shown in dashed lines. One terminal A of the inductive coupling coil L2 is connected through the heater element R1 of a first thermo-couple 3 to the return circuit 2 of the transmission line. The remaining terminal of the coupling coil L2 is connected through the heater element R2 of a second thermo-couple 4 to the return circuit 2 of the transmission line. The thermo-couples 3 and 4 are connected in series through a conventional microammeter M.

Figure 2 is a practical modification of the schematic circuit described in Figure 1. The transmission line conductor 1 is surrounded for a portion of its length by a coaxial cylindrical conducting element L which should preferably be considerably less than ½ wave length long. One extremity A of the coupling unit L is connected through the heater element R1 of the first thermo-couple 3 to the grounded return circuit 2 at the point C. The other extremity B of the coupling unit L is connected through the heater element R2 of the second thermo-couple 4 to the point D of the return circuit 2. The thermo-couples 3, 4 are connected in series to the terminals of a microammeter M in such a manner that the meter indicates the difference between the currents generated in the two thermo-couples. A variable capacitor C1 may be connected between the conductor 1 of the transmission line and the midpoint of the coupling device L. Preferably, the connection to the transmission line 1 should be made adjacent the connection to the coupling device L.

In operation, the coupling device L represents both inductive and capacitive coupling to the transmission line conductor 1. The capacitive coupling to the line may be increased by the variable capacitor C1 to increase the sensitivity of the indicating instrument, but as pointed out heretofore, an increase in the capacitive coupling will increase the power absorbed from the transmission line by the indicator circuit. Inductive currents I$l$ generated in the coupling unit L will flow around the loop circuit formed by the coupling unit L, the first thermo-couple heater unit R1, the return circuit 2 and the second thermo-couple heater element R2 in the manner indicated by the arrows, namely through points A, C, D, B in the order named. The capacitive currents generated in the coupling unit L, however, will flow directly from the point A to the point C and from the point B to the point D since such currents are due to substantially equal potential points on the coupling unit L between the extremities A, B. As a result of the different inductive and capacitive current flow for any instant, the inductive and capacitive currents I$l$ and I$c$, respectively, will have an additive effect upon the first thermo-couple heater element R1 and a differential effect upon the second thermo-couple heater element R2. Since normal thermo-couple action provides thermo-couple currents proportional to the squares of the currents in the respective heater elements, the indication provided by the microammeter M will be proportional to the difference between the squares of the sum and difference of the inductive and capacitive currents, namely (1) $\qquad I_M \propto (Il+Ic)^2 - (Il-Ic)^2 \propto 4IlIc$ Figure 3 is a modification of the use of the coupling unit L and the thermo-couples 3, 4 for a balanced transmission line wherein separate coupling units La and Lb are utilized for each of the conductors 1 and 11 of the balanced transmission line. The first thermo-couple heater element R1 is connected between adjacent extremities of the two coupling units La and Lb while the heater element R2 of the second thermo-couple 4 is connected between the other adjacent extremities of the two coupling units La, Lb.

Figure 4 is a modification of the circuits of Figures 1 and 2 in which the invention is adapted to use with a coaxial transmission line comprising an inner conductor 21 and an outer shield 22. A coupling unit L is supported in any convenient manner coaxial with, and surrounding, the inner conductor 21 of the coaxial line. The first thermo-couple heater element R1 is connected between the outer shield 22 and one extremity of the coupling unit L. The second thermo-couple heater element R2 is connected between the outer shield 22 and the other extremity of the coupling unit L. The thermo-couples are connected in series to the microammeter M in the same manner as described heretofore for the other modifications of the invention. However, the leads to the microammeter M should be shielded, as indicated by the dash lines 5, to prevent radiation or pickup from external sources.

It should be understood that an auxiliary capacity C1 may be employed with this modification in the same manner as that described in Figure 2, to increase the sensitivity of the indicating instrument. However, as mentioned heretofore, an increase in the capacitive coupling between the coupling unit L and the inner conductor 21 results in increased absorption by the measuring circuit.

Thus the invention described comprises an improved radio frequency wattmeter which employs unitary inductive coupling and relatively small capacitive coupling to one or more conductors of a radio frequency transmission line. Inductive and capacitive currents flowing through the couplings are applied to two thermocouples to provide a meter indication which is proportional to the power in the transmission line.

I claim as my invention:

1. A radio frequency wattmeter for a power transmission line including a coupling device comprising unitary means surrounding and coaxial with a portion of one of the conductors of said line for both inductively and capacitively coupling said device to said line, a pair of current-responsive devices, means including said inductive and capacitive coupling for deriving substantially in-phase currents proportional to the current and the voltage respectively in said line, means including said inductive and capacitive coupling for deriving substantially oppositely phased currents proportional to the current and voltage respectively in said line, means for applying said in-phase currents to one of said current-responsive devices, means for applying said oppositely phased currents to the other of said current-responsive devices, an indicator, and means connecting said indicator to said current-responsive devices.

2. A radio frequency wattmeter for a power transmission line including a coupling device comprising unitary means surrounding and coaxial with a portion of one of the conductors of said line for both inductively and capacitively coupling said device to said line, a pair of current-responsive devices, means including said inductive and capacitive coupling for deriving substantially in-phase currents proportional to the current and the voltage respectively in said line, means including said inductive and capacitive coupling for deriving substantially oppositely phased currents proportional to the current and voltage respectively in said line, means for applying said in-phase currents to one of said current-responsive devices, means for applying said oppositely phased currents to the other of said current-responsive devices, and means connected to said current-responsive devices to indicate the difference of the squares of the currents in each of said current-responsive devices.

3. A radio frequency wattmeter for a power transmission line including a coupling device comprising a cylindrical conducting member surrounding and substantially coaxial with a portion of said line for inductively and capacitively coupling said device to said line, a pair of current-responsive devices, means including said inductive and capacitive coupling for deriving substantially in-phase currents proportional to the current and the voltage respectively in said line, means including said inductive and capacitive coupling for deriving substantially oppositely phased currents proportional to the current and voltage respectively in said line, means for applying said in-phase currents to one of said current-responsive devices, means for applying said oppositely phased currents to the other of said current-responsive devices, an indicator, and means connecting said indicator to said current-responsive devices.

4. A radio frequency wattmeter for a power transmission line including a coupling device comprising a cylindrical conducting member surrounding and substantially coaxial with a portion of said line for inductively and capacitively coupling said device to said line, a pair of current-responsive devices, means including said inductive and capacitive coupling for deriving substantially in-phase currents proportional to the current and the voltage respectively in said line, means including said inductive and capacitive coupling for deriving substantially oppositely phased currents proportional to the current and voltage respectively in said line, means for applying said in-phase currents to one of said current-responsive devices, means for applying said oppositely phased currents to the other of said current-responsive devices, and means connected to said current-responsive devices to indicate the difference of the squares of the currents in each of said current-responsive devices.

5. A radio frequency wattmeter for a power transmission line including a coupling device comprising a cylindrical conducting member surrounding and substantially coaxial with a portion of one of the conductors of said line for inductively and capacitively coupling said device to said line, a pair of current-responsive devices, means including said inductive and capacitive coupling for deriving substantially in-phase currents proportional to the current and the voltage respectively in said line, means including said inductive and capacitive coupling for deriving substantially oppositely phased currents proportional to the current and voltage respectively in said line, means for applying said in-phase currents to one of said current-responsive devices, means for applying said oppositely phased currents to the other of said current-responsive devices, an indicator, and means connecting said indicator to said current-responsive devices.

6. A radio frequency wattmeter for a power transmission line including a coupling device comprising a cylindrical conducting member surrounding and substantially coaxial with a portion of one of the conductors of said line for inductively and capacitively coupling said device to said line, a pair of current-responsive devices, means including said inductive and capacitive coupling for deriving substantially in-phase currents proportional to the current and the voltage respectively in said line, means including said inductive and capacitive coupling for deriving substantially oppositely phased currents proportional to the current and voltage respectively in said line, means for applying said in-phase currents to one of said current-responsive devices, means for applying said oppositely phased currents to the other of said current-responsive devices, and means connected to said current-responsive devices to indicate the difference of the squares of the currents in each of said current-responsive devices.

7. A radio frequency wattmeter for a balanced transmission line including a unitary coupling device for each conductor of said line for inductively and capacitively coupling each of said devices to one of said conductors, a pair of current-responsive devices, means including said inductive and capacitive coupling for deriving substantially in-phase currents from each of said conductors proportional to the current and voltage respectively in each of said conductors, means including said inductive and capacitive coupling for deriving substantially oppositely phased currents from each of said conductors proportional to the current and voltage respectively in each of said conductors, means for combining said in-phase currents, means for combining said oppositely phased currents, means for applying said combined in-phase currents to one of said current-responsive devices, means for applying said combined oppositely phased currents to the other of said current-responsive devices, an indicator, and means connecting said indicator to said current-responsive devices.

8. A radio frequency wattmeter for a balanced transmission line including a unitary coupling device for each conductor of said line for inductively and capacitively coupling each of said devices to one of said conductors, a pair of current-responsive devices, means including said inductive and capacitive coupling for deriving substantially in-phase currents from each of said conductors proportional to the current and voltage respectively in each of said conductors, means including said inductive and capacitive coupling for deriving substantially oppositely phased currents from each of said conductors proportional to the current and voltage respectively in each of said conductors, means for combining said in-phase currents, means for combining said oppositely phased currents, means for applying said combined in-phase currents to one of said current-responsive devices, means for applying said combined oppositely phased currents to the other of said current-responsive devices, and means connected to said current-responsive devices to indicate the difference of the squares of the currents in each of said current-responsive devices.

9. A radio frequency wattmeter for a balanced transmission line including a coupling device for each conductor of said line comprising separate cylindrical conducting members each surrounding and substantially coaxial with a portion of different conductors of said line for inductively and capacitively coupling each of said devices to one of said conductors, a pair of current-responsive devices, means including said inductive and capacitive coupling for deriving substantially in-phase currents from each of said conductors proportional to the current and voltage respectively in each of said conductors, means including said inductive and capacitive coupling for deriving substantially oppositely phased currents from each of said conductors proportional to the current and voltage respectively in each of said conductors, means for combining said in-phase currents, means for combining said oppositely phased currents, means for applying said combined in-phase currents to one of said current-responsive devices, means for applying said combined oppositely phased currents to the other of said current-responsive devices, an indicator, and means connecting said indicator to said current-responsive devices.

10. A radio frequency wattmeter for a coaxial transmission line including a coupling device interposed between the inner and outer conductors of said line for inductively and capacitively coupling said device to the inner conductor of said line, a pair of current-responsive devices, means including said inductive and capacitive coupling for deriving substantially in-phase currents proportional to the current and voltage respectively in the inner conductor of said line, means including said inductive and capacitive coupling for deriving substantially oppositely phased currents proportional to the current and voltage respectively in said inner conductor, means connecting one of said current-responsive devices between said coupling device and said outer conductor of said line to apply said in-phase currents to said current-responsive device, means connecting the other of said current-responsive devices between said coupling device and said outer conductor to apply said oppositely phase currents to said other current-responsive device, an indicator, and means connecting said indicator to said current-responsive devices.

11. A radio frequency wattmeter for a coaxial transmission line including a coupling device interposed between the inner and outer conductors of said line for inductively and capacitively coupling said device to the inner conductor of said line, a pair of current-responsive devices, means including said inductive and capacitive coupling for deriving substantially in-phase currents proportional to the current and voltage respectively in the inner conductor of said line, means including said inductive and capacitive coupling for deriving substantially oppositely phased currents proportional to the current and voltage respectively in said inner conductor, means connecting one of said current-responsive devices between said coupling device and said outer conductor of said line to apply said in-phase currents to said current-responsive device, means connecting the other of said current-responsive devices between said coupling device and said outer conductor to apply said oppositely phased currents to said other current-responsive device, and means connected to said current-responsive devices to indicate the difference of the squares of the currents in each of said current-responsive devices.

12. A radio frequency wattmeter for a coaxial transmission line including a coaxial cylindrical coupling device of predetermined length interposed between the inner and outer conductors of said line for inductively and capacitively coupling said device to the inner conductor of said line, a pair of current-responsive devices, means including said inductive and capacitive coupling for deriving substantially in-phase currents proportional to the current and voltage respectively in the inner conductor of said line, means including said inductive and capacitive coupling for deriving substantially oppositely phased currents proportional to the current and voltage respectively in said inner conductor, means connecting one of said current-responsive devices between said coupling device and said outer conductor of said line to apply said in-phase currents to said current-responsive device, means connecting the other of said current-responsive devices between said coupling device and said outer conductor to apply said oppositely phased currents to said other current-responsive device, an indicator, and means connecting said indicator to said current-responsive devices.

13. Apparatus of the type described in claim 12 including shielding means for said indicator and said indicator connecting means.

14. A radio frequency wattmeter for a coaxial transmission line including a coupling device interposed between the inner and outer conductors of said line for inductively and capacitively coupling said device to the inner conductor of said line, a pair of current-responsive devices disposed between said coupling device and the outer conductor of said line, means including said inductive and capacitive coupling for deriving substantially in-phase currents proportional to the current and voltage respectively in the inner conductor of said line, means including said inductive and capacitive coupling for deriving substantially oppositely phased currents proportional to the current and voltage respectively in said inner conductor, means connecting one of said current-responsive devices between said coupling device and said outer conductor of said line to apply said in-phase currents to said current-responsive device, means connecting the other of said current-responsive devices between said coupling device and said outer conductor to apply said oppositely phased currents to said other current-responsive device, an indicator, and means connecting said indicator to said current-responsive devices.

CHARLES A. ROSENCRANS.